Oct. 1, 1968 E. H. GOOD ET AL 3,403,713

CUSHIONING CONTAINER

Filed Feb. 23, 1966

INVENTORS
ELMER H. GOOD,
LOWELL D. HAMMOND
BY THEIR ATTORNEYS
HARRIS, KIECH, RUSSELL & KERN

United States Patent Office 3,403,713
Patented Oct. 1, 1968

3,403,713
CUSHIONING CONTAINER
Elmer H. Good, Claremont, and Lowell D. Hammond, San Marino, Calif., assignors to Nash-Hammond, Incorporated, South El Monte, Calif., a corporation of California
Filed Feb. 23, 1966, Ser. No. 529,560
1 Claim. (Cl. 150—.5)

ABSTRACT OF THE DISCLOSURE

A double-walled container molded from plastic material in one piece and having an open-topped hollow inner shell, an open-topped hollow outer shell, and a top wall integral with the open tops of and interconnecting the inner and outer shells. A method of making such a container comprising placing uncured plastic material in a mold having a mold cavity complementary to the container and having surfaces respectively complementary to the inner and outer shells and the top wall, rotating the mold about at least two different axes to distribute the uncured plastic material evenly over all of the surfaces of the mold cavity, applying heat to the mold during the rotating step to fuse the plastic material to form the container, and thereafter removing the container from the mold.

Summary and objects of the invention

The present invention relates in general to containers having cushioning or shock absorbing qualities to protect the contents thereof during handling, shipping, or the like, and a primary object of the invention is to provide a container which has improved cushioning or shock absorbing characteristics and which may be manufactured relatively easily and inexpensively.

Shock absorbing containers frequently rely on fillers or inserts of cushioning material to absorb externally-applied shock forces and thus protect the contents thereof. An object of the present invention is to provide a container of double-walled construction wherein the walls themselves provide a substantial cushioning effect, thereby minimizing any necessity for auxiliary cushioning material.

More particularly, an object of the invention is to provide a double-walled cushioning container such as a box, tray, pan, or the like, having spaced inner and outer shells which are formed of a flexible and resilient plastic material and which are capable of absorbing externally applied shock forces with a minimum of auxiliary cushioning material.

Still more particularly, objects of the invention are to provide a double-walled cushioning container of the foregoing nature wherein the outer shell flexes to partially absorb externally-applied shock forces, and wherein the inner shell flexes to absorb shock forces transmitted to the contents of the container. In other words, the outer shell is capable of flexing relative to the inner shell to partially absorb shock forces, and the inner shell is capable of flexing relative to the outer shell to absorb substantially all residual shock forces. The combined actions of the flexible and resilient outer and inner shells in absorbing shock forces results in excellent cushioning for even very delicate articles in direct contact with the inner shell of the container, thereby minimizing the need for fillers, inserts, or the like, of auxiliary cushioning material. Various plastic materials, and particularly thermoplastic materials, may be used for the inner and outer shells of the double-walled container of the invention, preferred examples being polyethylene and polyvinyl chloride.

To achieve the foregoing composite cushioning action, it is important that the inner shell of the container be connected to the outer shell thereof in such a way that the entire inner shell can move relative to the outer shell, in addition to flexing relative to the outer shell. Accordingly, it is an important object of the invention to provide a flexible and resilient connecting wall between the inner and outer shells which positively connects the inner shell to the outer shell, but which is capable of flexing to permit bodily movement of the inner shell relative to the outer shell.

The basic object of the invention is to achieve the foregoing effects and results by molding the entire double-walled container in one piece, so that the flexible and resilient inner and outer shells are integrally joined by the flexible and resilient connecting wall.

While similar effects and results might be achieved by making the inner and outer shells as separate pieces and heat sealing, or otherwise joining, them together, this would involve considerable time, equipment and expense, particularly in relatively large containers wherein the inner and outer shells have open tops or top edges of considerable lengths to be heat sealed, or otherwise joined, together. The present invention, by molding the double-walled container in one piece, achieves the desired construction at considerably less expense, which is an important feature.

The foregoing objects, advantages, features and results of the present invention, together with various other objects, advantages, features and results thereof which will be evident to those skilled in the cushioning or shock absorbing container art in the light of this disclosure, may be achieved with the exemplary embodiment of the invention described in detail hereinafter and illustrated in the accompanying drawing.

Detailed description of the invention

Figure 1:
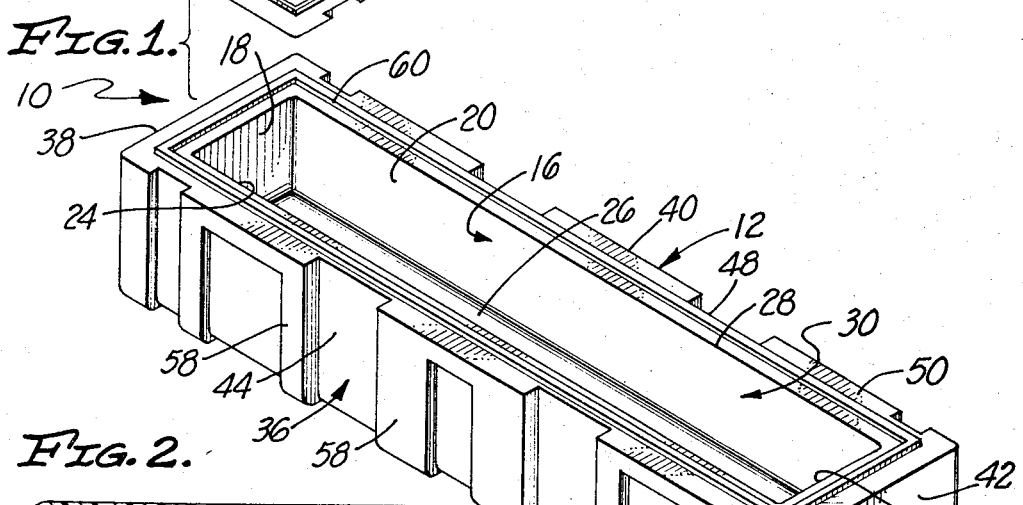
FIG. 1 is an exploded perspective view of a shock absorbing container which includes a container body and a closure each embodying the invention.
Figure 2:
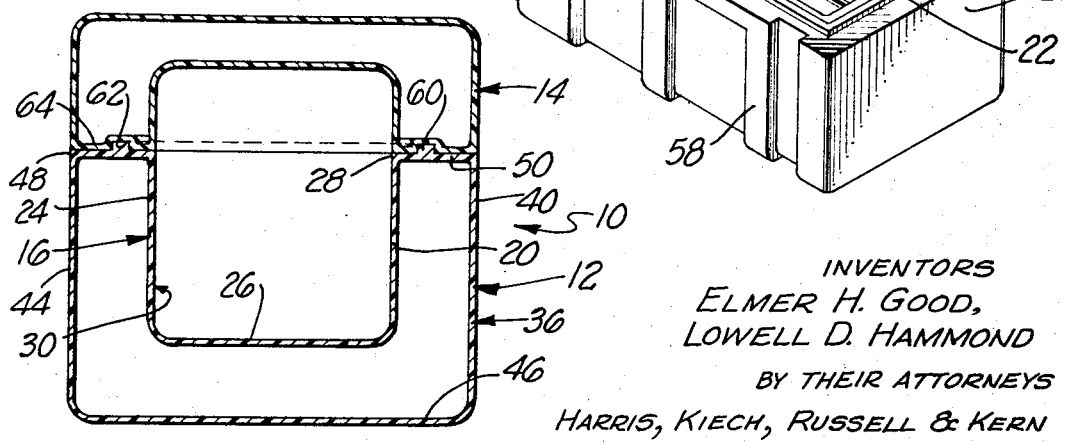
FIG. 2 is an enlarged, transverse sectional view through the container body and closure in assembled relation.

Referring initially to FIGS. 1 and 2 of the drawing, illustrated therein is a cushioning container 10 which is shown as including a container body 12 and a complementary container closure 14 of the invention. The container body 12 and the closure 14 are similar in construction so that only the container body 12 will be considered in detail.

The container body 12 is a one-piece, double-walled, open-topped, hollow member of flexible and resilient, molded plastic material, such as polyethylene, polyvinyl chloride, or the like.

The container body 12 includes an open-topped, hollow, molded inner shell 16 having sides or side walls 18, 20, 22 and 24, and having a closed bottom, defined by a bottom wall 26, and an open top or top edge 28. These elements of the inner shell 16 cooperate to define an open-topped compartment 30 for an article or articles to be handled or shipped in the container 10. The compartment 30 may have any desired configuration, depending on the configuration or configurations of the articles or articles to be placed therein.

The container body 12 further includes an open-topped, hollow, molded, outer shell 36 having sides or side walls 38, 40, 42 and 44 respectively spaced outwardly from the sides 18, 20, 22 and 24 of the inner shells 16. The outer shell 36 also includes a closed bottom, defined by a bottom wall 46, spaced outwardly, i.e., downwardly, from the bottom wall 26 of the inner shell 16, and includes an open top or top edge 48 spaced outwardly from the top edge 28 of the inner shell.

The top edges 28 and 48 of the inner and outer shells 16 and 36 are interconnected by a top wall 50 of the container body 12 which is molded integrally with the inner and outer shells. Thus, the entire container body 12 is molded in one piece.

Figure 3:
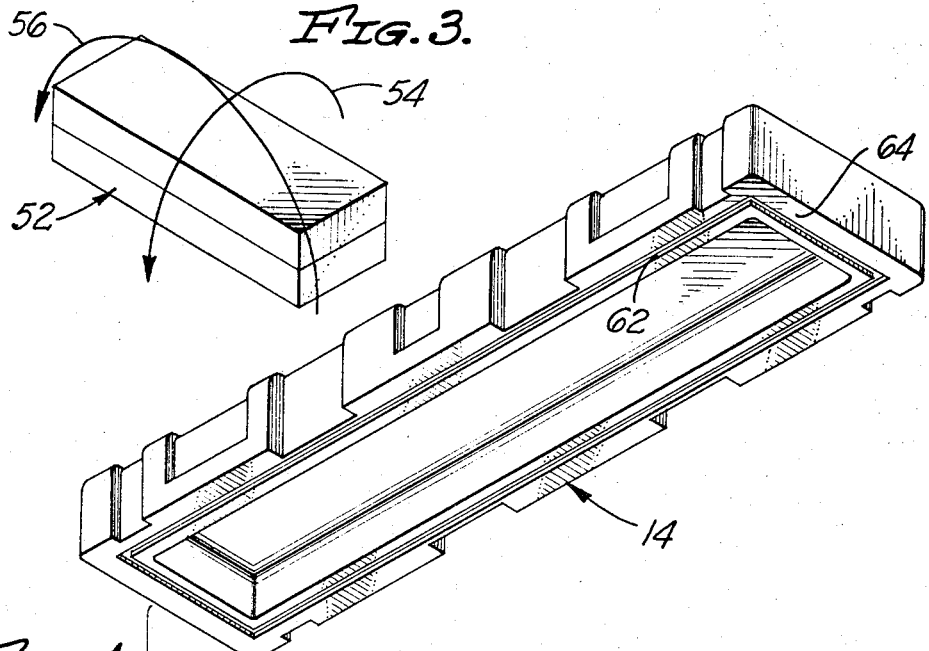
FIG. 3 is a schematic view illustrating how each of the members of the container can be formed in one piece by a conventional rotational molding process.

The foregoing one-piece molded construction for the container body 12 may be achieved through the use of conventional rotational molding equipment. More particularly, a quantity of uncured plastic material sufficient to produce the desired wall thickness for the inner and outer shells 16 and 36 and the wall 50 interconnecting them, is placed in a complementary cavity, not shown, in a suitable mold 52, FIG. 3. The mold 52 is then subjected to a tumbling action so that the uncured plastic is evenly distributed over all of the surfaces of the mold cavity. This tumbling action may be achieved by rotating the mold 52 about two perpendicular axes, as indicated by the arrows 54 and 56 of FIG. 3. The mold 52 is subjected to this tumbling action in an oven so that the externally-applied heat ultimately fuses or cures the plastic material to produce the one-piece, double-walled, open-topped, hollow container body 12.

With the container body 12 of the invention, the desired shock absorbing action is produced by the inner and outer shells 16 and 36 and the interconnecting wall 50 themselves, with a minimum need for auxiliary cushioning material around the contents of the compartment 30, or between the inner and outer shells. As previously explained, the desired cushioning action is achieved partly by flexing of the material of the outer shell 36, partly by flexing of the inner shell 16, and partly by bodily relative movement of the inner and outer shells as the result of flexure of the interconnecting wall 50.

The foregoing shock absorbing action can be achieved relatively inexpensively by molding the entire container body 12 in one piece in the manner described, as compared to making the inner and outer shells 16 and 36 as separate pieces and suitably joining them together. In other words, no elaborate jigs or fixtures for positioning the inner and outer shells while they are heat sealed, or otherwise joined, together are necessary, which is an important feature of the one-piece molded construction disclosed.

For reinforcement purposes, opposite side walls 40 and 44 and the bottom wall 46 of the outer shell 36 may be provided with integrally molded stiffening ribs 58 of any suitable configuration.

In the event that a sealed connection between the container body 12 and the closure 14 is desired, the interconnecting wall 50 between the inner and outer shells 16 and 36, which is preferably a substantially flat wall, is provided with an integrally molded rib 60 surrounding the open top of the compartment 30. This rib 60 is received in a complementary groove 62 in a complementary interconnecting wall 64 of the container closure 14.

If it is desired to secure the container body 12 and the closure 14 together, suitable catches, or the like, not shown, may be attached to the outer shell 36 between the stiffening ribs 58 and to the corresponding outer shell of the closure 14 between the corresponding stiffening ribs thereof. If a hinged closure 14 is desired, hinges may be attached to the outer shells of the container body 12 and the closure 14 along one side thereof. Such hinges and/or catches may be secured in any suitable manner, as by adhesives, explosive rivets, and the like.

It will be understood that the container 10 may have any configuration, depending upon the configuration of the article or articles to be placed therein. Thus, the particular configuration shown in the drawing is intended as illustrative only.

Although an exemplary embodiment of the invention has been disclosed herein for purposes of illustration, it will be understood that various changes, modifications and substitutions may be incorporated in such embodiment without departing from the spirit of the invention as defined by the claim which follows.

We claim as our invention:

1. A one-piece, double-walled, open-topped, hollow, molded plastic container including:
    (a) an open-topped, hollow, molded inner shell having sides and a closed bottom and an open top defining an open-topped compartment;
    (b) an open-topped, hollow, molded outer shell having sides and a closed bottom and an open top respectively spaced outwardly from said sides and closed bottom and open top of said inner shell;
    (c) a molded top wall surrounding said open top of said compartment and molded integrally with said open tops of said inner and outer shells so that said top wall and said inner and outer shells are all one piece;
    (d) said top wall being formed to define a groove extending therealong around the periphery of said open top; and having a wall thickness substantially equal to the thickness of said top wall; and
    (e) a plurality of spaced reinforcing ribs extending downwardly from the top of at least one side wall and continuously therefrom across said bottom and upwardly to the top of an opposed side wall to render said outer shell substantially rigid;
    (f) the width of said top wall at the ends of said container being at least as wide as said top wall at the sides thereof measured at the top of said ribs.

References Cited

UNITED STATES PATENTS

| | | | |
|---|---|---|---|
| 793,960 | 7/1905 | Rosenfeld | 150—5 X |
| 1,179,359 | 4/1916 | Hague | 220—9 |
| 1,504,353 | 8/1924 | Kilius | 220—9 |
| 1,854,415 | 4/1932 | Miller | 15—244 |
| 3,192,978 | 7/1965 | Horvath | 150—5 |
| 3,182,842 | 5/1965 | Hug | 215—13 |

JOSEPH R. LECLAIR, *Primary Examiner.*